United States Patent [19]

Tanaka et al.

[11] Patent Number: 4,958,956
[45] Date of Patent: Sep. 25, 1990

[54] SUBMERGED FLEXIBLE WAVE RESTRAINING STRUCTURE AND A METHOD OF CONSTRUCTING IT

[75] Inventors: Masahiro Tanaka; Takumi Ohyama; Akihiko Hirayama; Tetsushi Kiyokawa; Seiji Ichii; Yutaka Katsura; Tadashi Ono; Katsunori Shimizu, all of Tokyo, Japan

[73] Assignee: Shimizu Construction Co., Ltd., Tokyo, Japan

[21] Appl. No.: 99,958

[22] Filed: Sep. 23, 1987

[51] Int. Cl.⁵ .............................................. E02B 3/04
[52] U.S. Cl. ...................................... 405/23; 405/21; 405/25
[58] Field of Search .................. 405/21, 23, 25, 32

[56] References Cited

U.S. PATENT DOCUMENTS 3,191,386 6/1965 Wiegel et al. .................... 405/25
3,197,963 8/1965 Frederiksen ..................... 405/25

FOREIGN PATENT DOCUMENTS 69909 4/1983 Japan ................................ 405/25

OTHER PUBLICATIONS

Ocean Technology by: Y. Iwagaki et al., Kyroitsu Publishing Company.
Effects of Width of Barrier Structures Restraining Ability Thereof by: S. Naig et al Symposium for Ocean Technology, 1977.
Experimental Study on Propagation and Reflection Characteristics of Submerged Flexible Mounds by: M. Tanaka et al, 34th Symposium for Ocean Technology 1987.
Wave Restraining Characteristics of Resilient Membrane Structure by: M. Tanaka et al, 42nd Symposium for Civil Engineering, Sep., 1987.

Primary Examiner—Dennis L. Taylor
Assistant Examiner—J. Russell McBee
Attorney, Agent, or Firm—Armstrong, Nikaido Marmelstein, Kubovcik & Murray

[57] ABSTRACT

A resilient wave reducing structure which reduces waves propagating on liquid surface from propagating over the reducing structure and a method of constructing the wave reducing structure. The wave reducing structure of the present invention may be used to form a calm water surface region for harbors, for areas where construction work is being done or for areas where marine sports are to be performed etc. The resilient wave reducing structure includes at least one energy absorbing device having a resilient body constructed on a bottom of the liquid bounding the region where waves have to be reduced and filled with surrounding ambient liquid. This reduces the amplitude of waves passing over it by consuming the wave energy while it deforms according to the pressure distribution change caused by the waves and by radiating its kinetic energy into the liquid and the ground surrounding it. Because the wave reducing structure is resilient and deeply submerged under water, it does not hinder ships from passing over it. Therefore, it becomes possible to create a calm region on a liquid surface without hindering a navigation of ships and without creating a danger of wrecking the ships.

7 Claims, 14 Drawing Sheets

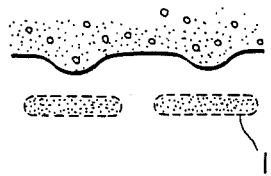
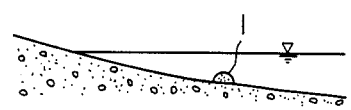
FIG.2(a)  FIG.2(b)
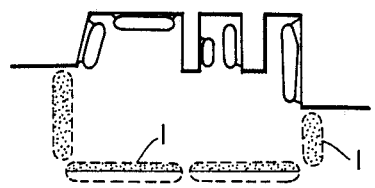
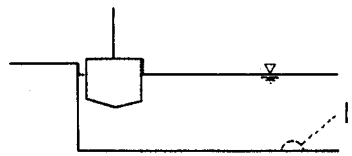
FIG.2(c)  FIG.2(d)
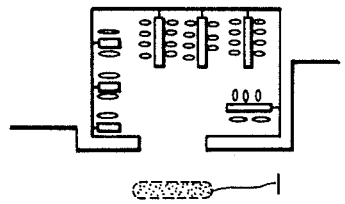
FIG.2(e)

SUBMERGED FLEXIBLE WAVE RESTRAINING STRUCTURE AND A METHOD OF CONSTRUCTING IT

BACKGROUND OF THE INVENTION

1. Field of the Invention

The present invention is related to breakwaters or wave reducing structures used to create a calm region on a liquid surface. More specifically, the invention is related to wave reducing structures which is made of a resilient material, submerged under the liquid at the boundary of the region and restrains waves from propagating over the boundary. The present invention is also related to a method of constructing the submerged flexible wave reducing structure.

2. Prior Arts

It is sometimes needed to create a calm region on a water surface by reducing outside waves from getting inside over the boundary. A typical example is a breakwater or a jetty at a harbor which is constructed to protect ships moored inside. But the same needs exist also in other occasions, such as, at a construction site of marine structures where a safety has to be secured, at a waterfront which has to be protected from wave errosion or at a marine amusement area where marine sports such as water skiing are to be performed.

Breakwaters currently in use comprise breakwaters outstanding out of the water surface and breakwaters submerged under the water. Conventional breakwaters are further classified, according to its material, to stone structures, reinforced concrete structures and piled up concrete block structures. Breakwaters outstanding out of water surface are used when it is needed to almost perfectly isolate the region from the outside waves. Submerged breakwaters are used when the propagation of waves into the region is acceptable to some extent. These conventional breakwaters are effective but their disadvantages are that they are costly, take much time for construction and are difficult to remove when needed. Further, they obstruct the navigation of ships and are sometimes dangerous for ships passing around them because the ships may be thrown against the breakwater or pushed to get wrecked on the submerged breakwater by the waves.

Conventional breakwaters are constructed by casting concrete in place, by laying down pre-fabricated caissons or by piling up pre-fabricated concrete blocks. These methods require much labor and time because a large amount of materials have to be transported and large quantity of work has to be done on site. Therefore, construction of breakwaters costs very high as far as these conventional structures and conventional construction methods are employed.

SUMMARY OF THE INVENTION

Given the above-mentioned disadvantages of conventional breakwaters and methods of constructing them, the present invention has an object of providing a wave reducing structure which is cost-saving, quickly constructable and quickly removable while maintaining its wave reducing ability at least as effective as current submerged breakwaters.

In the present invention, above object is realized by constructing at least one energy absorbing resilient body which is, for example, a pliant bag filled with water, submerged under water. Because the bag is resilient, it deforms as waves come over it due to the pressure distribution change and local water flow caused by the waves. The wave energy is consumed by the resilient bag as a result of, first, an interaction between the movement of water and the deformation of the bag and, second, an energy consumption within the bag.

Further object of the present invention is to provide a wave reducing structure which does not obstruct the navigation of ships and which is safe for the ships running there around. The wave reducing structure is safe for the ships because, first, they are made of a resilient material and, second, height of the resilient body is as low as around one half of the water depth, much lower than conventional submerged breakwaters, yet maintaining the ability of reducing waves. In addition, when the wave reducing structure is laid at the entrance of a harbor, it becomes possible to reduce waves more completely from getting into the harbor yet securing a passage of ships over the wave reducing structure.

Still further object of the present invention is to provide a method of constructing the resilient wave reducing structure, which enables to construct it easily and quickly. As explained in more detail later, the wave reducing structure is quickly constructed by submerging a hermetical bag under water, injecting water in the bag, and anchoring the bag on the water bottom, for example.

Effectiveness of the present invention, especially the relation between its geometrical properties and its wave reducing ability, is verified by an intensive experimental study.

BRIEF DESCRIPTION OF THE DRAWINGS

FIG. 2(a) to (e) are perspective views explaining the usage of wave reducing structures of the present invention.

DETAILED DESCRIPTION OF THE PREFERRED EMBODIMENTS OF THE INVENTION

Figure 1:
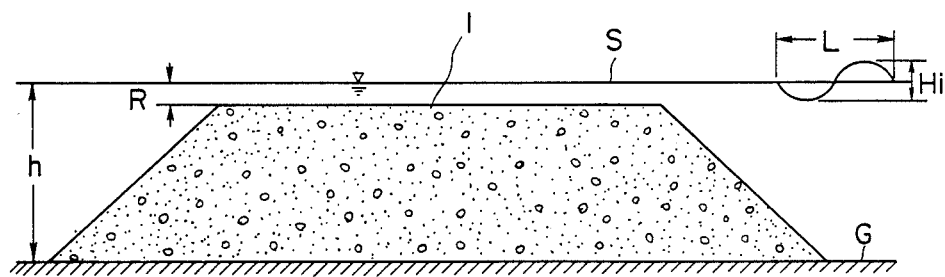
FIG. 1 (prior art) is a cross-sectional view of a conventional submerged breakwater.
Figure 3A:
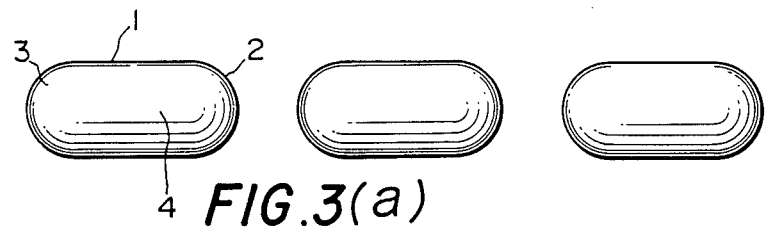
FIG. 3(a) to (c) are perspective views of the resilient wave reducing structures.
Figure 3B:
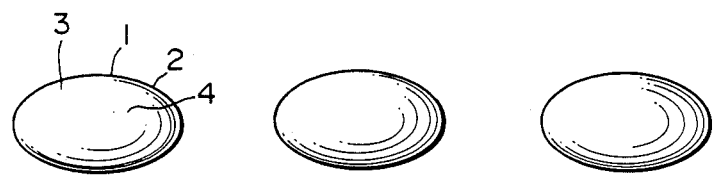
Figure 3C:
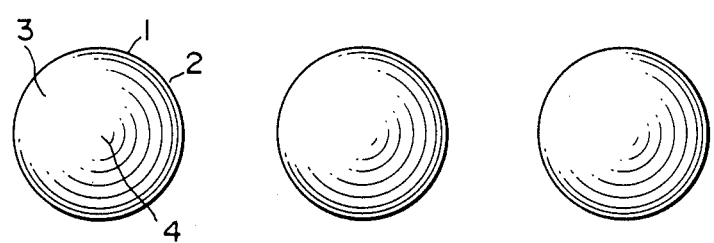

A resilient wave reducing structure according to the present invention comprises at least one resilient body 1 constructed on the water bottom, as shown in FIG. 2. As shown in FIG. 3, the resilient body 1 has a generally flat base 2 conformable with the water bottom and an upper body 3 in a spherical, ellipsoidal or semi-cylindrical form. The resilient body 1 is set up on the water bottom so that the top 4 of which is submerged under the water surface. The resilient body 1 is enough resilient to deform according to the pressure distribution change caused by the waves propagating over it.

The mechanism how the wave reducing structure restrains the wave from propagating over it is explained as follows.

The waves which we see on the water surface is accompanied with a pressure distribution change and a local water flow beneath the wave. The wave is the kinetic energy and the potential energy being transmitted in a continuous media.

When the waves rush to a conventional breakwater outstanding out of the water surface, the energy being transmitted by the waves is almost perfectly reflected by the breakwater except for the energy consumed by breaking waves which may occur when the wave is high. Therefore, practically, no energy is transmitted through this type of breakwaters.

When the waves rush to a conventional submerged breakwater, which is constructed on the water bottom so that its top is submerged under the water, a portion of the energy is reflected, a portion of the energy is transmitted over the submerged breakwater and the rest of the energy is consumed by breaking waves. The breaking waves occur when the wave height exceeds the level in which the stability of the oscillating water surface can not be maintained due to its too steep inclination. In these cases it is necessary to make the submergence ratio small and to keep the width of the breakwater relatively large. But the amount of energy consumption by breaking waves is not large in most cases, because, as long as the stability of the wave surface is maintained, such high waves do not occur in ordinary conditions. The deeper the breakwater is submerged under the water, the larger the amount of the energy transmitted over it becomes. Considering this nature of conventional breakwaters, their height is determined, in most practical cases, to be higher than 80% of the water depth so as to secure the ability of reducing waves.

In case of the wave reducing structure according to the present invention, the energy being transmitted up to the wave reducing structure is partially consumed, partially reflected by the resilient body and partially transmitted over the resilient body. The difference from conventional breakwaters is that the amount of energy consumed by the resilient body is far larger than the energy consumed by the conventional submerged breakwaters due to a mechanism explained schematically as follows.

Because the wave is accompanied with a pressure distribution change beneath it, the resilient body of the wave reducing structure is forced to deform and to vibrate as the wave passes over it. In other words, the resilient body behaves in itself a resilient and energy consuming boundary bounding the water region.

In this case, a portion of the wave energy is consumed to excite a vibration of the body. And the vibration energy is radiated simultaneously into the surrounding water as local water flow and sound waves. This is what is called an interaction between the resilient body and the outside water. The resilient body consumes a considerably large portion of vibration energy as it vibrates. It may be because the vibration of the body causes non-linear fluid flows such as eddy current flows in the fluid inside the body, and such flows irreversibly consume the kinetic energy. The resilient body also consumes its vibration energy by radiating its kinetic energy into the ground beneath it as body waves. And then, about one half of the resting energy is transmitted into the water region on the other side of the body. It is because the resting energy is radiated approximately uniformly to all directions, that is, around one half of the energy is transmitted over the reducing and the other half of the energy is reflected in the inverse direction.

After all, a far larger portion of the wave energy is consumed by the resilient body compared to the conventional breakwaters. That is, the energy transmitted over the resilient wave reducing structure is smaller than the energy transmitted over conventional breakwaters. In other words, a resilient wave reducing structure can be much smaller than conventional breakwaters while obtaining a same wave reducing ability.

Figure 4A:
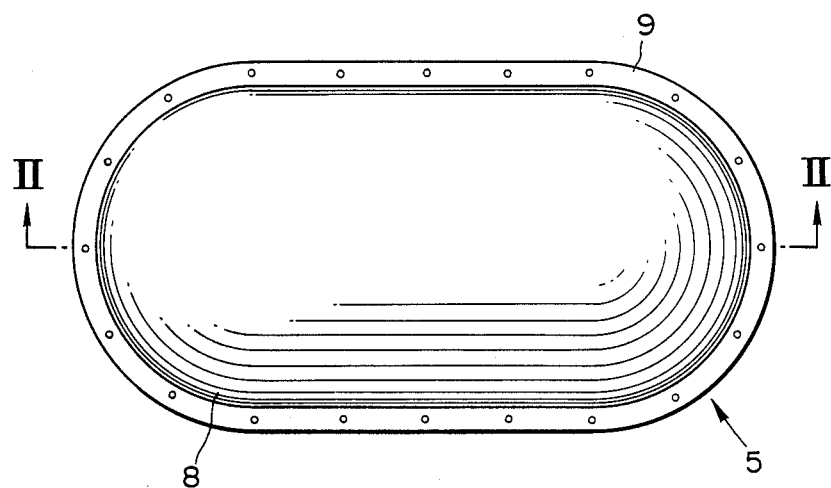
FIG. 4 is a perspective view of a modified resilient wave reducing structure.
Figure 4B:
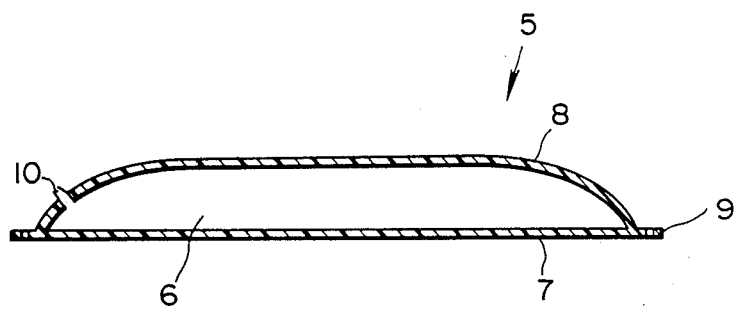

In a modified embodiment of the invention, the resilient body may comprise a hermetic pliant bag 5 expanded by a inner fluid 6 contained in it, as shown in FIG. 4. The pliant bag 5 is made of a pliant and practically hermetic material such as poly-vinyl-chloride, fiber or web reinforced rubber etc. The bottom 7 of the bag 5 is flat so as to be conformable with the water bottom and the upper part 8 of the bag 5 is formed in a spherical form. The bottom 7 and the upper part 8 are secured to each other at a flange 9 surrounding their peripheries in a generally hermetic manner by means of welding, adhesives, sewing or a fastener. The bag 5 is preferably provided with a injection nozzle 10 through which a fluid is injected to expand the bag 5. The water surrounding the bag 5 may be injected in the bag, but also mud, sand and gravel can be injected in the bag to increase the apparent weight of the bag 5 and to fix the bag 5 on the water bottom. The air can also be injected when an increased buoyancy is needed. Rigidity and height of the bag 5 can be adjusted by increasing or decreasing the amount of the fluid contained in the bag 5.

Figure 5:
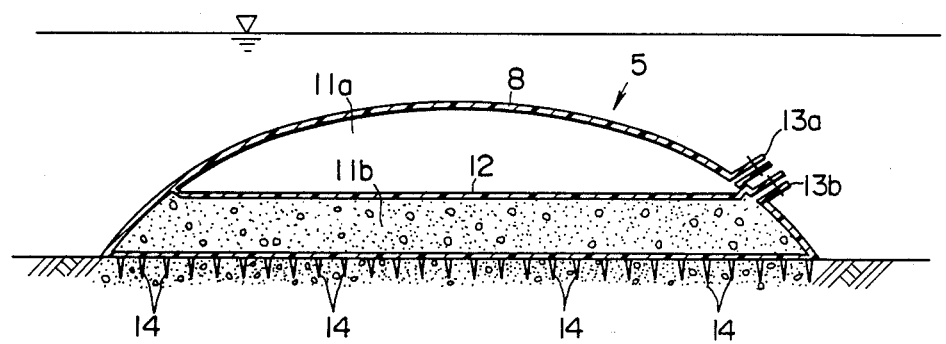
FIG. 5 is a perspective views of a further modified resilient wave reducing structure.

In a modified example of preferred embodiment of the invention shown in FIG. 5, the space inside the bag 5 is separated into two chambers 11a, 11b by a diaphragm 12. Each chamber 11a, 11b has a injection nozzle 13a, 13b connecting the inner side of the bag to the outer side thereof. The lower chamber 11b is filled with a mixture of water, mud, sand and gravel in order to increase the apparent weight of the bag 5 and to increase its resistance against sliding on the water bottom. The upper chamber 11a is filled with water. The bottom 7 of the bag 5 may preferably be provided with nails 14 in order to increase the resistance against sliding.

Figure 6:
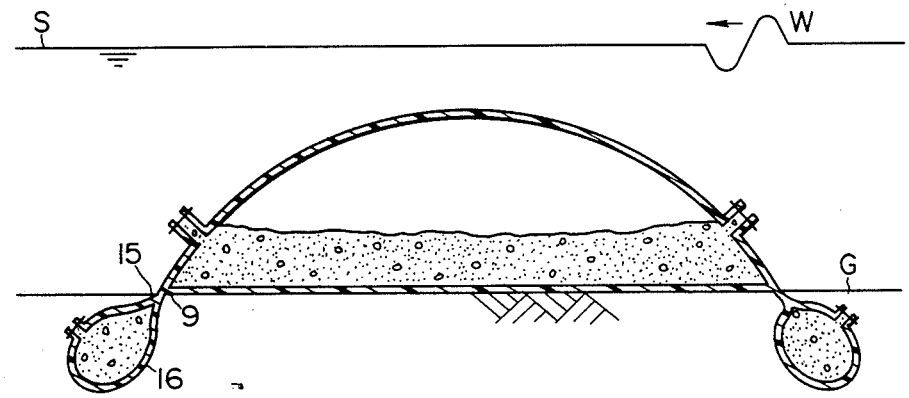
FIG. 6(a) and (b) are perspective views of a still further modified resilient wave reducing structure.

In a further modified embodiment of the invention, as shown in FIG. 6, the bag 5 is provided with a skirt 15 which is secured to the outer periphery of the flange 9 and extends radially outwardly. Anchor means 16 are attached to the skirt 15 at its outer periphery. The anchor means 16 and an outer portion of the skirt 15 is embedded in the water bottom surrounding the bag 5. Because the skirt 15 is embedded around the bag 5 so as to disallow water from getting beneath the bag 5, the skirt 15 prevents the bag 5 from being lifted up and dislocated due to a water flow around the bag 5. Thus the bag 5 is more firmly secured to the water bottom. The anchor means 16 may be wedges driven into the water bottom or masses embedded in it. The anchor means might be whether attached to the bag or connected to the bag via connecting means such as wire ropes or chains.

Figure 7:
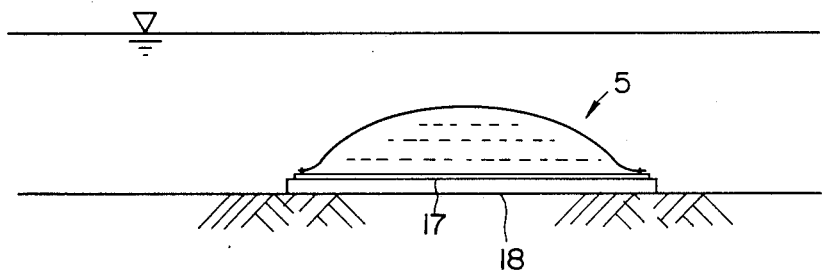
FIG. 7 is a perspective view of a still further modified resilient wave reducing structure.

Further, in another modified embodiment, shown in FIG. 7, the bottom wall 17 of the bag 5 is provided with a weight means 18 or the bottom wall 17 of the bag 5 is made monolithicly with a plate 18 of reinforced concrete, acting as a hermetical boundary closing hermetically the bottom of the bag 5 and as a weight means increasing the apparent weight of the bag in order to secure the sliding resistance of the bag 5.

Figure 8A:
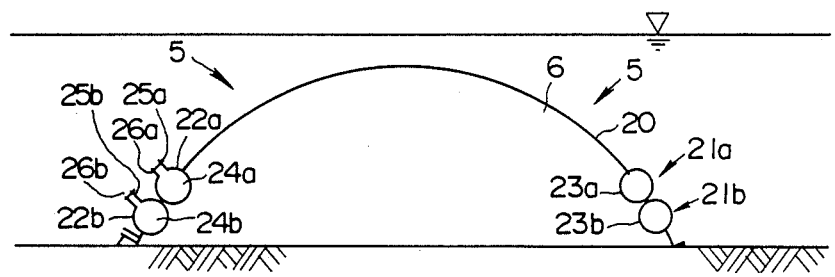
FIG. 8(a) and (b) are perspective views of a still further modified resilient wave reducing structure.
Figure 8B:
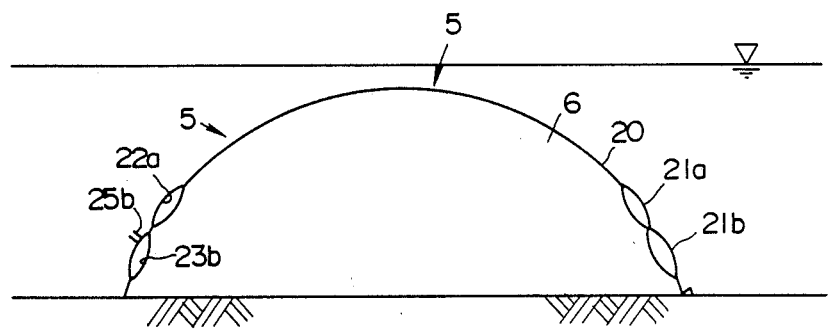

In a further modified embodiment of the invention, the side wall 20 of the bag 5 is provided with height adjusting means 21a, 21b, as shown in FIG. 8. The height adjusting means 21a, 21b, comprising outer walls 22a, 22b and inner walls 23a, 23b and forming closed tubular regions 24a, 24b respectively, surround circumferentially the bag 5. The height adjusting means 21a, 21b are provided with injection nozzles 25a, 25b connecting its inner tubular regions 24a, 24b and the outer region respectively and means 26a, 26b to close the injection nozzles 25a, 25b. Each of the tubular regions 24a, 24b are separated from the region 6 formed inside the bag 5. When the height adjusting means 21a, 21b are filled tightly with water as shown in FIG. 8(a), the height of the bag 5 becomes relatively low because the height of the height adjusting means 21a, 21b decreases as the cross-section becomes round. On the contrary, when the height adjusting means 21a, 21b are only loosely filled with water, as shown in FIG. 8(b), the bag becomes higher than the former case because the cross-section of the height adjusting means 21a, 21b becomes more slender. Thus, by means of the height adjusting means 21a, 21b, height of the bag 5 is adjustable independently of the rigidity of the bag 5. It is naturally possible to lower the bag 5 by depressurizing the bag 5.

Figure 9:
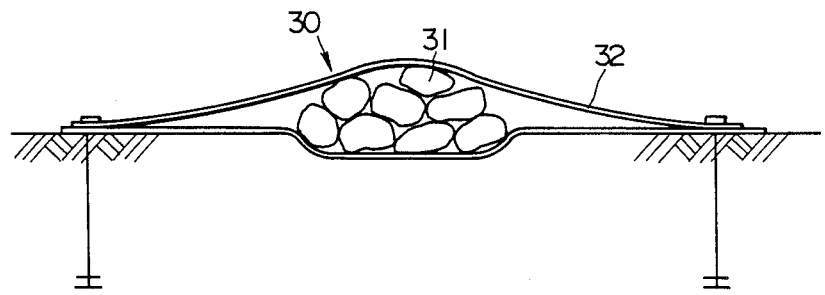
FIG. 9 is a perspective view of a still further modified resilient wave reducing structure.

In a further modified embodiment, shown in FIG. 9, the wave reducing structure 30 comprises one or more resilient bags 31 each of which is not anchored to the water bottom and is captured by a net 32 anchored to the water bottom. By this embodiment, reliability of the wave reducing structure increases because each resilient bag 31 containing water becomes smaller and rupture of single bag 31 does not reduce practically the wave reducing effect of the structure 30. Further, because the bags 31 are covered by the net 32, no harsh stress is produced on the bag 31. The embodiment facilitates the repairing and maintenance of the structure 30 also.

Figure 10:
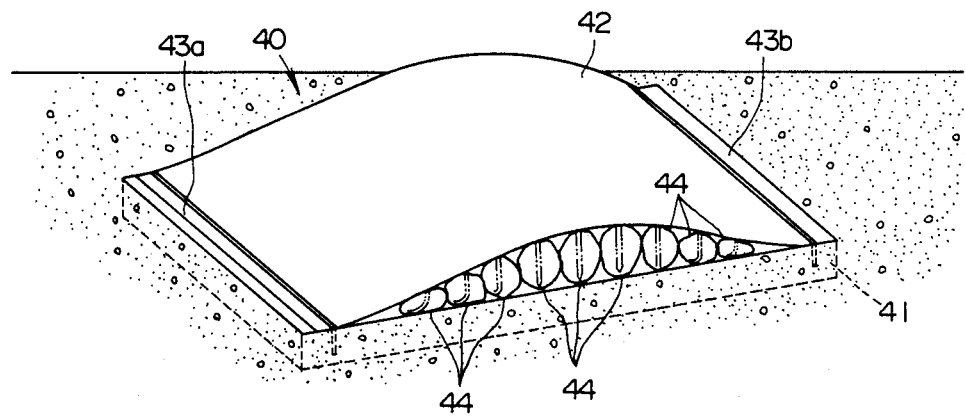
FIG. 10 is a perspective view of a still further modified resilient wave reducing structure.
Figure 11A:
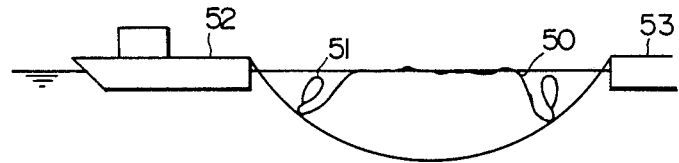
FIG. 11(a) to (d) are perspective views showing a method of constructing the resilient wave reducing structure.
Figure 11B:
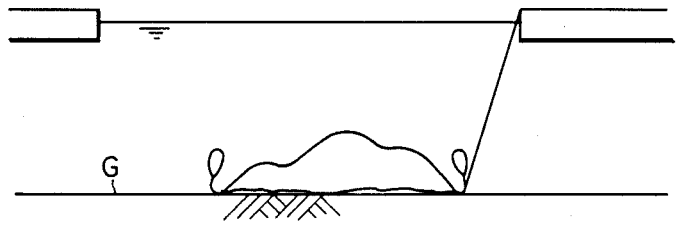
Figure 11C:
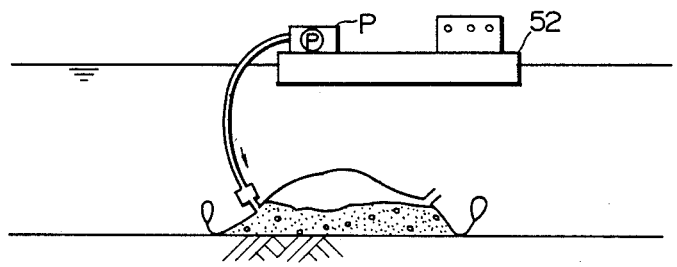
Figure 11D:
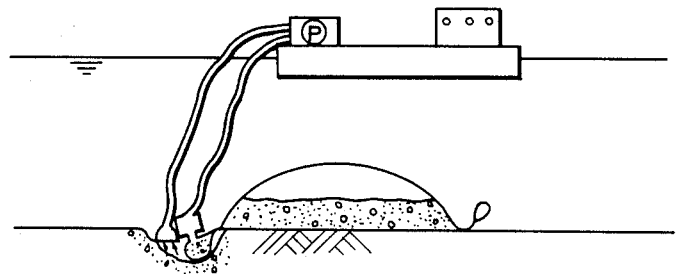
Figure 12A:
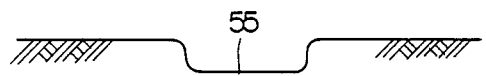
FIG. 12(a) to (d) are perspective views showing a modified method of constructing the resilient wave reducing structure.
Figure 12B:
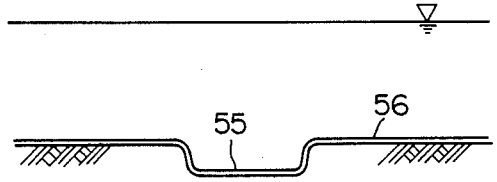
Figure 12C:
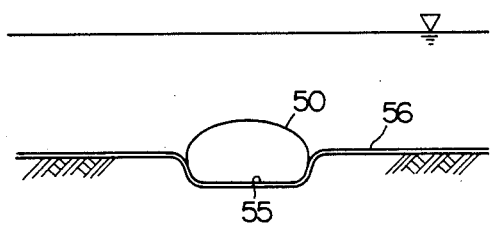
Figure 12D:
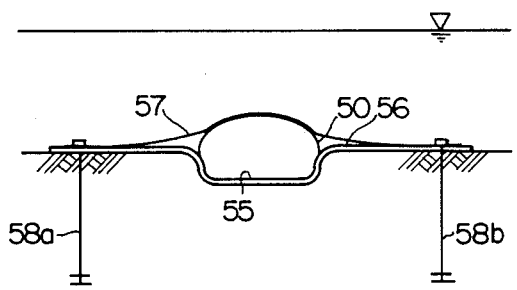

In a further modified embodiment, shown in FIG. 10, the pliant bag 40 comprises a bottom plate 41 which is whether or not rigid and heavy, a rectangular sheet 42 of a pliant material which is attached to the bottom plate 41 at their two opposing edges 43a, 43b. The pliant sheet 42 is provided with substantially hermetic containers 44 which are attached to the inner side of the sheet 42 and filled with water. As the containers 44 are expanded by the water, the pliant sheet 42 is lifted from the bottom plate 41 and forms a wave reducing structure 40. In this case also, the effectiveness of the wave reducing structure 40 is damaged little by an unexpected rupture of single container 44. When the expansion of a container 44 becomes insufficient, it can be expanded independently from the others by injecting water into it. The base plate 41 of the bag 40 may be replaced by anchor means to fix the bag 40 by being driven in the water bottom or weight means.

Methods of constructing the above-mentioned resilient wave reducing structures are explained hereafter.

According to the present method of constructing resilient wave reducing structures, the pliant bags being comprised in the wave reducing structure are conveyed by a ship over the point where the structure has to be installed, the bag is spread on the surface of the water, water is injected in the bag, the bag is sunk by means of weight means such as concrete masses, and the bag is secured on the water bottom by anchor means. Because the material transported to the construction point is only the pliant bags and anchor means, the method drastically reduces the transportation lord compared to the construction of conventional breakwaters. This method shortens also drastically the construction period because of its simplicity of the procedure. As a result, the method reduces strongly the construction cost. Construction procedure is explained in more detail with reference to the drawings as follows.

FIG. 11 shows an example of method to construct a wave reducing structure according to the present invention. The pliant bag 50 is folded at first and to which anchor means 51 are attached. The pliant bag 50 is conveyed by a ship 52 to the water region where the structure is to be installed. One of the points on the periphery of the bag is secured on the ship 52 and another point generally opposing the first point is secured to another ship 53. The two ships 52, 53 move apart from each other so that the bags 50 is spread on the surface of the water (FIG. 11(a)). Hose 54 is connected to the injection nozzle of the bag 50 and water is injected in the bag 50 by means of a pump mounted on the ship 52 so that the inner water pressure of the bag 50 becomes a prescribed value. In this step, mud, sand or gravels may be injected in the bag 50 together with water if the facilities permit (FIG. 11(c)). The mud etc injected in the bag 50 increases the apparent weight of the bag 50 which increases the resistance of the bag 50 against sliding when it is layed on the bottom of the water. The bag 50 is laid down slowly on the bottom of the water by paying out the rope connecting the bag 50 to the ships 52, 53 (FIG. 11(b)). The steps of FIG. 11(b) and (c) may be operated simultaneously, that is, the bag 50 may sink gradually as water is pumped into it. The bag 50 laid on the water bottom is anchored onto it by driving the anchor means 51 into the bottom (FIG. 11(d)). Thus completes the construction of the resilient wave reducing structure.

FIG. 12 shows another example of a method for constructing the reducing structure. In this example, the bottom of the water is dug to form a depression 55 which is practically in a same dimension with the bag 50 to be laid on it and a pliant sheet 56 is spread to cover the depression 55 before laying down the bag 50 on it (FIG. 12(a) and (b)). A smooth concrete bed may be constructed to cover the depression 55 instead of spreading a pliant sheet 56. This step of spreading a pliant sheet 56 or its equivalent step is desirable, especially in case where the surface of the water bottom is rocky and rough, in order to protect the bag 50 from being hurt or broken. The bag 50 is laid down on the sheet 56 or concrete bed 55 (FIG. 12(c)). A net 57, which is anchored on the water bottom by anchor means 58a, 58b, is spread to cover the bag 50 whether or not the bag 50 is provided with anchor means. A step of spreading a pliant sheet 56 and a step of spreading a net 57 are added to the former method in this example. But these steps only slightly elongates the total construction period because the step of spreading a pliant sheet or constructing a smooth bed on the depression 55 can be performed while the pliant bag 50 is being prepared for installation. So, according to this method also, the resilient wave reducing structure is constructed quickly and easily.

Figure 13:
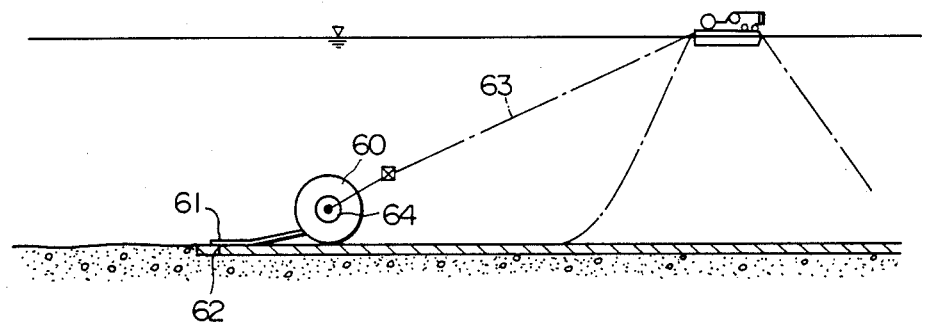
FIG. 13 is a perspective view showing a further modified method of constructing the resilient wave reducing structure.

FIG. 13 explains another method of constructing the resilient wave reducing structure. In this method, the bag 60 is submerged under water before it is expanded by water. As shown in FIG. 13, the rolled pliant bag 60 is submerged under water. Then, the outermost end of the rolled bag 61 is secured on the bottom of the water by anchor means 62. A ship pulls the wire rope 63 connected to the shaft 64 of the rolled bag 60 apart from the anchor means 62 and spreads the bag under water. After being spread over a prescribed area, the periphery of the bag is secured on the water bottom by means of anchoring means. Then the bag 60 is expanded by being injected water therein. According to this method also, the resilient wave reducing structure is constructed quickly and easily.

Figure 14:
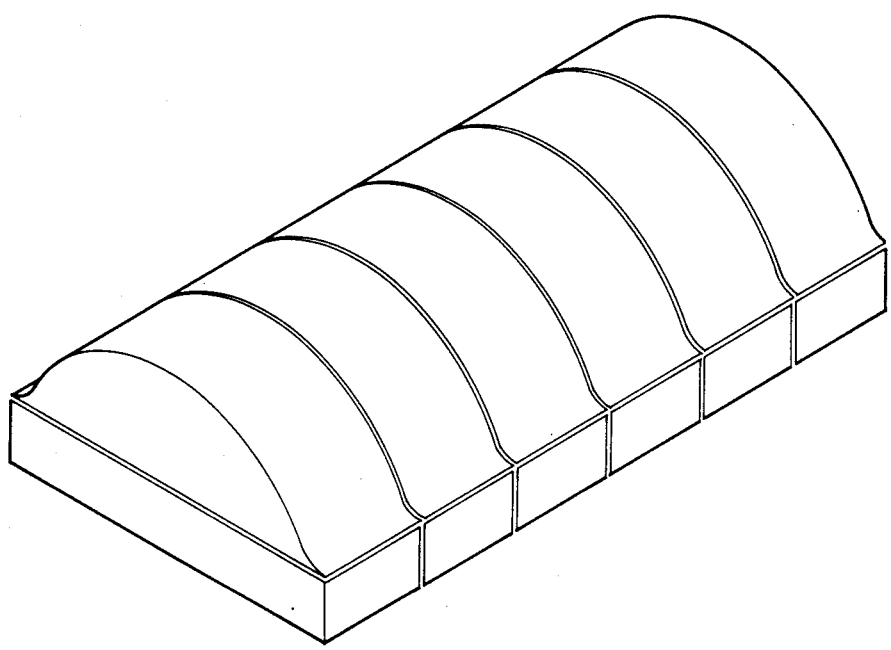
FIG. 14 is a perspective views showing a further modified method of constructing the resilient wave reducing structure.

FIG. 14 shows further modified method of constructing a resilient wave reducing structure. In this method, before expanding the pliant bag, segments of the pliant bag is submerged under water and the segments are connected each other to form a pliant bag.

EXAMPLE

Next, the relation between the wave reduction effect of the resilient body and the geometrical parameters defining the resilient body is examined experimentally as follows.

Resilient wave reducing structures and rigid wave reducing structures, both having an identical form, were installed in a water tank and waves were generated by a wave generator to propagate toward the wave reducing structures while changing the parameters of the wave reducing structures and wave conditions. Amplitudes of the incident waves and transmitted waves are measured.

Figure 15:
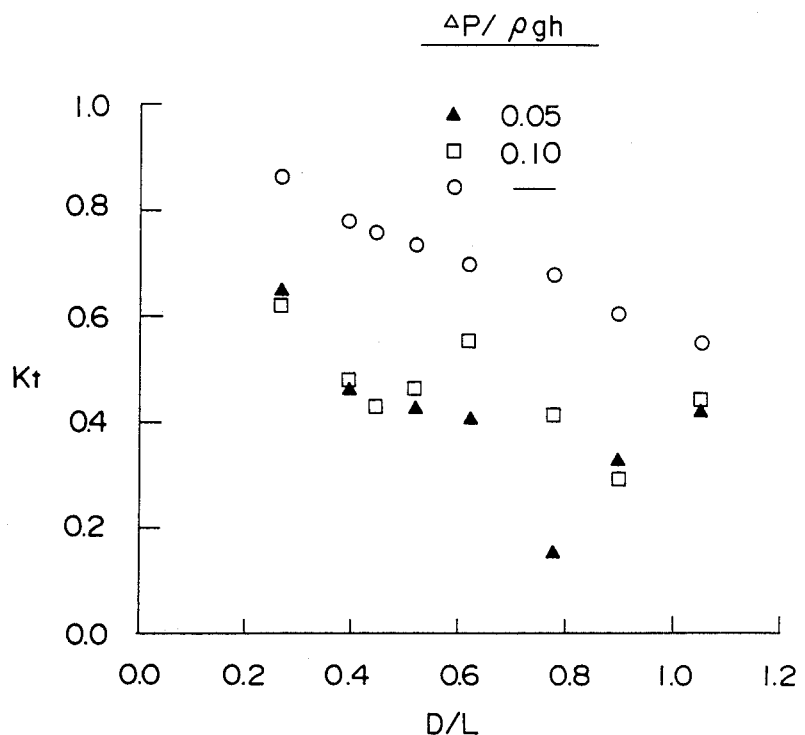
FIG. 15 is a graph showing relations between the parameters defining the shape of wave reducing structures and the wave reducing ability.

FIG. 15 shows a relation between the parameters of the resilient body and the wave reducing effect. The axis of abscissa shows the width D of the resilient body along the direction of wave propagation normalized by the wave length L, that is W/L. The ordinate shows the transmission coefficient Kt defined by the ratio of transmitted wave height to incident wave height. Kt is an index which indicates the wave reducing ability. The smaller Kt is, the larger the effect of reducing. Circles denote the results of rigid wave reducing structures. Squares denote the results of resilient bodies wherein the pressure inside the resilient body is higher than the outer region by 10%. Triangles denote the results of resilient bodies wherein the inner pressure is higher than the outer pressure by 5%. The result shows that, for a same D/L, Kt for resilient bodies are smaller than that of rigid structures which result indicates that the resilient wave reducing structures are more effective than the rigid structures in reducing the wave height when the width of the structures D is the same. The result corresponding to rigid barriers also indicates that the effectiveness of wave reducing structures increases as the increase of its width. But width of the resilient wave reducing structure does not affect in such a simple manner. It should be noted that the resilient wave reducing structures are more effective than rigid breakwaters throughout a wide range of D/L.

Figure 16:
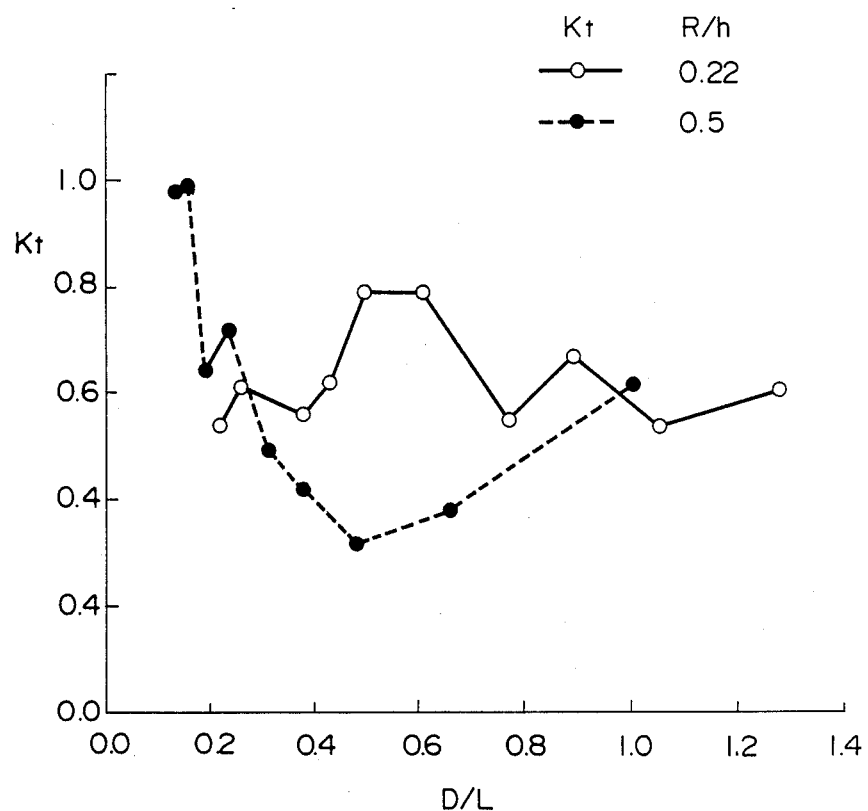
FIG. 16 is a graph showing relations between the submergence ratio and the wave reducing ability.

FIG. 16 shows the effects of the submergence ratio R/h which is defined as a ratio of the depth of water R covering the top of the structure and the water depth h in the area around the structure. The result shows that, except for the cases wherein D/L is smaller than 0.3, Kt in case of R/h being 0.5 is smaller than Kt in case of R/h being 0.22%. This result indicates that the resilient wave reducing structures are more effective when their heights are around the mid-depth of the water region than they are around 0.8 of the region. The result also shows that the resilient wave reducing structures preserve its effectiveness even when the heights are as low as around one half of the water depth, while such low conventional breakwaters are no longer effective.

Another remarkable point observed in the experiments is that waves do not break when the resilient wave reducing structures are used while the waves break rather easily when the rigid breakwaters are used.

The experimental results shown in FIGS. 15 and 16 verifies that the resilient wave reducing structures are more effective than the rigid structures even when their width is smaller than that of rigid breakwaters and that the resilient wave reducing structures are effective even though the height is around one half of the water depth of the region. Considering that height of the rigid breakwaters have to be larger than 0.8 times the water depth of the region, these characteristics of the resilient wave reducing structure indicates that the volume of the resilient wave reducing structure can be far less than that of rigid breakwater. Further, the resilient wave reducing structures are shown to be more desirable from a point of view of safety because they do not break waves.

As explained heretofore, the present invention provides a wave reducing structure which is more effective in reducing waves from propagating over it than conventional submerged breakwaters. The wave reducing structure of the present invention is smaller in height and width compared to the conventional ones. Present wave reducing structure is much lighter than the conventional breakwaters. The difference in weight becomes far larger when the water depth is large. It is because the amount of the material used in a flexible wave reducing structure of the present invention increases generally proportionally to the water depth, while the volume and the mass of the conventional breakwater increases generally proportionally to the square of the water depth. Because waves are not broken when the wave reducing structure is employed, it is safer than conventional breakwaters. Because the wave reducing structure can be pre-fabricated on land and can be transported easily, construction period of the wave reducing structure is far shorter than that of the conventional breakwaters. The wave reducing structures are also removable when it is needed. As a result of shortened construction period, reduction of mass to be transported and easiness in construction, construction cost of the wave reducing structure is much lower than that of conventional breakwaters.

Because the wave reducing structure is submerged deeper under water even compared to conventional breakwaters, the reducing structures do not hinder ships from passing over it. Even when a ship may collide against the reducing structure, the ship is received and bounced softly owing to the resilience of the structure. Therefore the wave reducing structure is safe for the ships and persons passing around the structure.

Present invention also provides an easy and quick method of constructing resilient wave reducing structures. According to the method, construction of the wave reducing structure becomes much easier than that for conventional breakwaters resulting in an uncomparable decrease of construction period and construction cost.

The resilient wave reducing structure and the method for constructing it are explained according to the accompanying drawings. But the resilient wave reducing structures invented here are not reduced to the structures and methods expressed in the drawings, any structure falls in the invention as long as the structure has a energy absorbing means having a resilient body submerged under water where the waves have to be restrained. The method of constructing resilient wave reducing structures invented here is not reduced to the above-mentioned preferred embodiments and any methods falls in the invention as long as it comprises a step of submerging a pliant bag under water, a step of injecting water thereinto and a step of securing the bag on the water bottom.

In the above mentioned preferred embodiments and examples, the liquid under which the wave reducing structure is submerged is water. But the liquid is not reduced to water but it may be oil or the like.

What is claimed is:

1. A wave reducing structure for reducing waves on a liquid surface from propagating over a certain border, comprising at least one energy absorbing means, constructed submergedly on a bottom of the liquid beneath the border, for absorbing the energy of waves, the energy absorbing means having at least one resilient body which is deformable when a pressure distribution around it changes as the waves pass over the resilient body, each said at least one resilient body comprising at least one substantially hermetic pliant bag which is expanded by a fluid contained therein, said fluid being comprised of the surrounding ambient liquid, said pliant bag being provided with at least one diaphragm separating an inner area of the pliant bag into closed chambers, a height of the resilient body being between 0.2 to 0.8 times the depth of the liquid surrounding the at least one resilient body.

2. A wave reducing structure according to claim 1, wherein the pliant bag is provided with at least one anchor means.

3. A wave reducing structure according to claim 1, wherein a bottom wall of the pliant bag is provided with a weight means of which the density is larger than the density of the liquid.

4. A wave reducing structure according to claim 1, wherein the pliant bag is covered by a resilient covering anchored onto the bottom of the liquid at its periphery.

5. A wave reducing structure for reducing waves on a liquid surface from propagating over a certain border, comprising at least one energy absorbing means, constructed submergedly on a bottom of the liquid beneath the border, for absorbing the energy of waves, the energy absorbing means having at least one resilient body which is deformable when a pressure distribution around it changes as the waves pass over the resilient body, each said at least one resilient body comprising at least one substantially hermetic pliant bag which is expanded by a fluid contained therein, said fluid being comprised of the surrounding ambient liquid, a height of the resilient body being between 0.2 to 0.8 times the depth of the liquid surrounding the at least one resilient body, wherein side walls of the pliant bag are provided with at least one height adjusting means, each height adjusting means being disposed between an upper part and a lower part of side walls to link them around their circumference and comprises an inner wall and an outer wall forming a closed tubular-room therebetween, the height of the pliant bag being adjustable by adjusting the amount of a fluid to be contained in the room.

6. A wave reducing structure for reducing waves on a liquid surface from propagating over a certain border, comprising at least one energy absorbing means, constructed submergedly on a bottom of the liquid beneath the border, for absorbing the energy of waves, the energy absorbing means having at least one resilient body which is deformable when a pressure distribution around it changes as the waves pass over the resilient body, each said at least one resilient body comprising at least one substantially mermetic pliant bag which is expanded by a fluid contained therein, said fluid being comprised of the surrounding ambient liquid, a height of the resilient body being between 0.2 to 0.8 times the depth of the liquid surrounding the at least one resilient body, wherein the pliant bag comprises:

(a) a rectangular bottom plate having a higher density compared to the liquid;

(b) a rectangular pliant sheet of which first pair of opposing sides are longer than corresponding sides of the bottom plate and second pair of opposing sides are not longer than corresponding sides of the bottom plate, the second pair of opposing sides being secured to the bottom plate in the vicinity of its corresponding sides respectively; and (c) at least one substantially hermetic container made of a pliant material, each container comprising a side wall and a pair of end covers defining generally a cylindrical closed space filled with a fluid, secured to the pliant sheet at a surface facing the bottom plate so that a longitudinal axis of each cylindrical closed space is parallel to the second pair of opposing sides of the bottom plate.

7. A wave reducing structure for reducing waves on a liquid surface from propagating over a certain border, comprising at least one energy absorbing means, constructed submergedly on a bottom of the liquid beneath the border, for absorbing the energy of waves, the energy absorbing means having at least one resilient body which is deformable when a pressure distribution around it changes as the waves pass over the resilient body, each said at least one resilient body comprising at least one substantially hermetic pliant bag which is expanded by a fluid contained therein, said fluid being comprised of the surrounding ambient liquid, a height of the resilient body being between 0.2 to 0.8 times the depth of the liquid surrounding the at least one resilient body, wherein the energy absorbing means comprises a plurality of energy absorbing elements, each of the elements comprising a rectangular base plate having a density larger than the density of the liquid beneath which the energy absorbing means are submerged and a covering sheet made of a resilient material attached to the base plate at peripheries thereof so as to form an approximately half-cylindrical hermetical closed space therebetween adapted to contain liquid therein defining the pliant bag, the energy absorbing elements being adapted to form an approximately half-cylindrical form as they are disposed closely one to the others.

* * * * *